United States Patent
Chen et al.

(10) Patent No.: US 10,147,396 B2
(45) Date of Patent: Dec. 4, 2018

(54) DRIVING SYSTEM SUPPORTING MULTIPLE DISPLAY MODES

(71) Applicant: Shenzhen China Star Optoelectronics Technology Co., Ltd., Shenzhen, Guangdong (CN)

(72) Inventors: Yu-yeh Chen, Guangdong (CN); Yu Wu, Guangdong (CN); Jianjun Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 105 days.

(21) Appl. No.: 15/308,339

(22) PCT Filed: Jul. 12, 2016

(86) PCT No.: PCT/CN2016/089740
§ 371 (c)(1),
(2) Date: Nov. 1, 2016

(87) PCT Pub. No.: WO2017/190424
PCT Pub. Date: Nov. 9, 2017

(65) Prior Publication Data
US 2018/0151155 A1    May 31, 2018

(30) Foreign Application Priority Data
May 5, 2016   (CN) .......................... 2016 1 0293166

(51) Int. Cl.
G09G 5/22   (2006.01)
G06F 3/14   (2006.01)
(Continued)

(52) U.S. Cl.
CPC ............ *G09G 5/222* (2013.01); *G06F 3/1438* (2013.01); *G09G 3/36* (2013.01); *G09G 5/001* (2013.01);
(Continued)

(58) Field of Classification Search
CPC .................. G09G 5/222; G09G 5/001; G09G 2310/0243; G09G 2310/0264; G09G 2330/028; G06F 3/1438
See application file for complete search history.

(56) References Cited

U.S. PATENT DOCUMENTS

2008/0303836 A1 *   12/2008   Ludden ................ G09G 3/2092
345/531

FOREIGN PATENT DOCUMENTS

CN    102034411 A    4/2011
CN    103325349 A    9/2013
(Continued)

*Primary Examiner* — Charles Hicks
(74) *Attorney, Agent, or Firm* — Andrew C. Cheng

(57) ABSTRACT

A driving system capable of supporting multiple display modes is provided. The driving system includes a memory for storing gamma codes corresponding to various display modes, a gamma voltage generation device producing gamma voltages corresponding to the gamma codes, and a timing controller accessing the gamma codes stored in the memory and writing the gamma codes into the gamma voltage generation device according to mode switch signals. The gamma voltage generation device then produces gamma voltages corresponding to the input gamma codes during the vertical blank interval of the display device, thereby achieving display mode switch. The memory may also be integrated in the timing controller. Compared to the prior art, the driving system is compatible with various display modes with reduced cost.

2 Claims, 1 Drawing Sheet

(51) Int. Cl.
  *G09G 5/00* (2006.01)
  *G09G 3/36* (2006.01)
  *G09G 5/10* (2006.01)

(52) U.S. Cl.
  CPC ....... *G09G 5/10* (2013.01); *G09G 2310/0243* (2013.01); *G09G 2310/0264* (2013.01); *G09G 2320/0276* (2013.01); *G09G 2320/0673* (2013.01); *G09G 2330/028* (2013.01)

(56) References Cited

FOREIGN PATENT DOCUMENTS

| | | |
|---|---|---|
| CN | 103915073 A | 7/2014 |
| CN | 10534003 A | 2/2016 |
| KR | 20130067808 A | 6/2013 |

\* cited by examiner

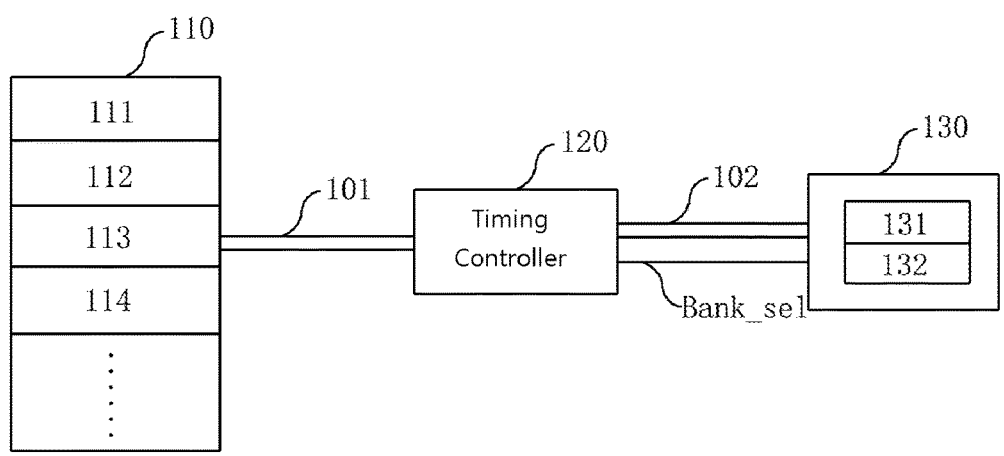

DRIVING SYSTEM SUPPORTING MULTIPLE DISPLAY MODES

BACKGROUND OF THE INVENTION

1. Field of the Invention

The present disclosure relates to display technologies, and in particular to a driving system capable of supporting multiple display modes.

2. The Related Arts

Existing driving structure to display device has a gamma voltage generation device (P-gamma IC) producing gamma voltages. The P-gamma IC is an integrated circuit having digital logic circuit and digital-analog conversion (DAC) circuit. There usually are two storage units in the P-gamma IC to store two gamma codes and, according to existing techniques and the limitation of the two gamma codes, the P-gamma IC at most can produce two gamma voltages.

However as the functions of the display devices are getting more advanced and comprehensive, a display device may have multiple display modes such as 2D@60 Hz, 2D@120 Hz, 3D@120 Hz (or 3D@240 Hz). Since the cell TFTs (thin film transistors) have different charging times under different display modes, the gamma voltages for different display modes are also different. For this kind of display devices, three or four gamma voltages are required.

A single existing P-gamma IC cannot satisfy this requirement. If more or more P-gamma ICs are used, the cost would be significantly increased. Additionally, in order to achieve mode switch, there will also be extra cost for adding MOS switches. On the other hand, if a user does not utilize these display modes, the added P-gamma IC resource is wasted.

SUMMARY OF THE INVENTION

To obviate the shortcomings of the prior art, the present disclosure teaches a driving system capable of supporting multiple display modes while maintaining a low cost and preventing flickering and abnormality when switching display modes.

The driving system is for a display device and includes a memory storing gamma codes corresponding to a number of display modes, a gamma voltage generation device producing gamma voltages corresponding to the gamma codes, and a timing controller accessing the gamma codes stored in the memory and writing a first gamma code accessed into the gamma voltage generation device after receiving a first mode switch signal. The gamma voltage generation device produces gamma voltage corresponding to the first gamma code written by the timing controller during the vertical blank interval of the display device, thereby achieving display mode switch. The memory is inside the timing controller.

In one embodiment, the gamma voltage generation device includes two banks, and the first gamma code written by the timing controller is stored in a first bank of the two banks.

In one embodiment, the timing controller accesses the gamma codes stored in the memory and writing a second gamma code accessed into the gamma voltage generation device after receiving a second mode switch signal. The second gamma code written by the timing controller is stored in a second bank of the two banks other than the first bank. The gamma voltage generation device produces gamma voltage corresponding to the second gamma code written by the timing controller during the vertical blank interval of the display device, thereby achieving display mode switch.

In one embodiment, the timing controller is connected to the memory through a set of wires, and is connected to the gamma voltage generation device through a second set of wires.

In one embodiment, the memory includes a number of storage spaces, each storing a gamma code corresponding to one of the display modes.

In one embodiment, the timing controller accesses the gamma codes stored in the memory through the first set of wires, and writes the gamma codes accessed into the gamma voltage generation device through the second set of wires.

The present disclosure also teaches a driving method for a display device. The driving method includes the following steps: accessing gamma codes stored in a memory and writing a first gamma code accessed into a gamma voltage generation device by a timing controller after receiving a first mode switch signal, and producing gamma voltage corresponding to the first gamma code written by the timing controller by the gamma voltage generation device during the vertical blank interval of the display device, thereby achieving display mode switch.

In one embodiment, the gamma voltage generation device includes two banks; and the first gamma code written by the timing controller is stored in a first bank of the two banks.

In one embodiment, the driving method further includes the following steps: accessing the gamma codes stored in the memory and writing a second gamma code accessed into the gamma voltage generation device by the timing controller after receiving a second mode switch signal, storing the second gamma code written by the timing controller in a second bank of the two banks other than the first bank by the gamma voltage generation device, and producing gamma voltage corresponding to the second gamma code written by the timing controller by the gamma voltage generation device during the vertical blank interval of the display device, thereby achieving display mode switch.

Compared to the prior art, the present disclosure, through accessing multiple gamma codes stored in the memory and producing corresponding multiple gamma voltages, achieves the support to different display modes while maintaining a low cost and preventing flickering and abnormality when switching display modes.

BRIEF DESCRIPTION OF THE DRAWINGS

To make the technical solution of the embodiments according to the present disclosure, a brief description of the drawings that are necessary for the illustration of the embodiments will be given as follows. Apparently, the drawings described below show only example embodiments of the present disclosure and for those having ordinary skills in the art, other drawings may be easily obtained from these drawings without paying any creative effort. In the drawings:

FIG. 1 is a schematic diagram showing a driving system according an embodiment of the present disclosure.

DETAILED DESCRIPTION OF THE PREFERRED EMBODIMENTS

In the following embodiments of the present disclosure are explained in details along with the accompanied drawing so as to clearly present the advantages, features, and ways of implementation of the present disclosure. It should be understood that the present disclosure is not limited to the following embodiments and there may be various variations. These embodiments are simply for persons of the related arts to understand the scope of the present disclosure.

It should also be understood that, even though elements are referred to as "first," "second," "third," etc., these terms are only used to distinguish one element from another and no specific order is implied. Therefore, without departing from the teaching of the present closure, a first element in one embodiment may be named as a second element in another embodiment.

Unless otherwise defined, all technical and scientific terms of the present disclosure should be interpreted with their ordinary meaning as perceived by persons of the art. These terms should also be interpreted not only with their existing meaning at the time of the present disclosure. These terms may include equivalent terms invented afterwards. Additionally, unless specifically specified, the terms should not be interpreted or limited with overly idealized or official meanings.

FIG. 1 is a schematic diagram showing a driving system according an embodiment of the present disclosure.

As illustrated, the driving system includes a memory 110, a timing controller (TCON) 120, and a P-gamma IC 130. The memory 110 is for storing timing codes from the TCON 120 and gamma codes from the P-gamma IC 130. The TCON 120 is for controlling the operation timing of the P-gamma IC 130 and provides control signals to the P-gamma IC 130. The P-gamma IC 130 of the present embodiment is different from the P-gamma IC of the prior art in that the P-gamma IC 130 of the present embodiment may access the gamma codes stored in the memory 110 through the TCON 120. The P-gamma IC 130 of the present embodiment therefore may only retrieve the gamma codes and produce corresponding gamma voltages. More details will be given below.

The memory 110 is preferably an Electrically-Erasable Programmable Read-Only Memory (EEPROM) but is not limited as such. For illustration's purpose, the memory 110 is depicted in FIG. 1 as being located outside the TCON 120. Alternative embodiments may have the memory 110 inside the TCON 120. For example, the memory 110 may be a flash memory or EEPROM inside the TCON 120. The memory 110 may include four storage spaces 111 to 114 for storing gamma codes. Alternatively, a different number of storage spaces, such as 3, may be included. The four storage spaces 111 to 114 store a first gamma code to a fourth gamma code, respectively. The first to fourth gamma codes have fixed addresses, and correspond to a first display mode to a fourth display mode (such as 2D@60 Hz, 2D@120 Hz, 3D@120 Hz, and 3D@240 Hz) respectively. More specifically, the first storage space 111 stores the first gamma code corresponding to the first display mode 2D@60 Hz, the second storage space 112 stores the second gamma code corresponding to the second display mode 2D@120 Hz, the third storage space 113 stores the third gamma code corresponding to the third display mode 3D@120 Hz, and the fourth storage space 114 stores the fourth gamma code corresponding to the fourth display mode 3D@240 Hz.

The memory 110 is connected to the TCON 120 through a first set of wires 101, and the TCON 120 is connected to the P-gamma IC 130 through a second set of wires 102. The first set of wires 101 may include serial data line (SDA) and serial clock line (SCL). The second set of wires 102 may also include SDA and SCL.

The P-gamma IC 130 may include a first bank 131 and a second bank 132, each capable of storing a set of gamma codes. One of the first or second bank 131 or 132 may be used to store a gamma code corresponding to a current display mode, and the other bank may be used to store another gamma code corresponding to another display mode about to be switched to.

When the display system of the present embodiment is powered on, a default display mode may be the first display mode 2D@60 Hz. In alternative embodiments, the display system may adopt a different default display mode specified by a user such as the second display mode 2D@120 Hz.

The TCON 120 may determine the current display mode based on the configuration of the display device. For example, the current display mode may be determined to be one of 2D@60 Hz, 2D@120 Hz, 3D@120 Hz, and 3D@240 Hz. The TCON 120 accesses one of the first to fourth gamma codes corresponding to the current display mode. The first to fourth gamma codes are stored in the first to fourth storage spaces 111 to 114, respectively. In one embodiment, the current display mode is the first display mode 2D@60 Hz and the TCON 120 accesses the first gamma code stored in the first storage space 111. In another embodiment, the current display mode is the third display mode 3D@120 Hz and the TCON 120 accesses the third gamma code stored in the third storage space 113.

The TCON 120 writes the accessed gamma code into one of the first or second bank 131 or 132 through the second set of wires 102. Then P-gamma IC 130 produces the required gamma voltage corresponding to the current display mode. In other words, one of the first and second banks 131 and 132 may store the current display mode's gamma code.

When the display device receives a switch signal from remote control or other control device to switch the display mode from the current display mode to another mode, for example from the second display mode 2D@120 Hz to the third display mode 3D@120 Hz, the TCON 120 determines that the new display mode is 3D@120 Hz from the switch signal, switches to 3D format, and accesses the third gamma code corresponding to the third display mode 3D@120 Hz stored in the third storage space 113 through the first set of wires 101. The TCON 120 then writes the third gamma code into the P-gamma IC 130 through the second set of wires 102. The P-gamma IC 130 produces the required gamma voltage for the third display mode 3D@120 Hz. In one embodiment, the switch of the display modes by the remote control or other control device is a sequential one such as following the order of the first display mode, the second display mode, the third display mode, and the fourth display mode. Alternatively, there may be a different sequential order, or the display mode may be randomly specified (i.e., there is no specific order).

To avoid flickering or abnormal display resulted from the display mode switch and therefore variation of gamma voltages, the TCON 120 may provide a control signal Bank_sel to the P-gamma IC 130 to control the P-gamma IC 130. In one embodiment, the gamma code for the default display mode when the display device is powered on is stored in the first bank 131 (i.e., the first bank 131 stores the gamma code of the current display mode), and the gamma code for the display mode to be switched to is stored in the second bank 132. However, please note that the present disclosure is not limited as such. More details are given below.

In the following, an example is used to explain the switch of display modes and how the control signal Bank_sel controls the P-gamma IC 130. Again, for persons skilled in the art, the example is not intended to limit the scope of protection of the present disclosure.

Let the current display mode is the second display mode 2D@120 Hz, and the first bank 131 stores the second gamma code corresponding to the second display mode 2D@120 Hz. When the display device receives the switch signal from remote control or other control device to switch the display mode to the third display mode 3D@120 Hz (or the fourth display mode 3D@240 Hz), the TCON 120 retrieves the third gamma code corresponding to the third display mode from the memory 110 through the first set of wires 101, and writes the third gamma code into the second bank 132 of the P-gamma IC 130 through the second set of wires 102.

During the vertical blank (Vblank) interval, the TCON 120 provides the Bank_sel signal to the P-gamma IC 130 which, after receiving the Bank_sel signal, produces the gamma voltage for the third display mode according to the third gamma code, thereby switching the display mode to the third display mode 3D@120 Hz. The Bank_sel signal may be a high pulse signal of a fixed width but is not limited to such. For example, the Bank_sel signal may be a low pulse signal as well.

After the switch, the third display mode 3D@120 Hz becomes the current display mode. In other words, the second bank 132 now stores the gamma code corresponding to the current display mode.

To switch to a next display mode, say, the first display mode 2D@60 Hz, the TCON 120 retrieves the first gamma code corresponding to the first display mode from the first storage space 111 of the memory 110, and writes the first gamma code into the first bank 131 of the P-gamma IC 130. Then, during the vertical blank (Vblank) interval, the P-gamma IC 130, after receiving the Bank_sel signal from the TCON 120, produces the gamma voltage for the first display mode according to the first gamma code, thereby switching the display mode to the first display mode 2D@60 Hz. After the switch, the first bank 131 now stores the first gamma code corresponding to the first display mode which is the current display mode.

Therefore, no matter there are how many display modes, their corresponding gamma codes may all be stored in the storage space of the memory. Also, no matter what order these display modes are switched, one of the first and second banks of the P-gamma IC may store the gamma code corresponding to the current display mode and the other stores the gamma code corresponding to a next display mode to be switched to. The P-gamma IC as such is able to produce gamma voltages required by these display modes.

The present disclosure, through accessing the gamma codes stored in the storage spaces of the memory, facilitates the output of gamma voltages for different display modes with reduced cost.

Additionally, through the control signal Bank_sel, the TCON achieves control to the P-gamma IC and display mode switch during the Vblank interval. The present disclosure therefore may prevent flickering or display abnormality due to display mode switch and changes to the gamma voltages.

The present disclosure further teaches a display device including a driving system and a display panel. The driving system is one in accordance with the driving system of the present disclosure.

The display device is one of a liquid crystal panel, a cellular phone, a tablet computer, a display device with curved panel, a notebook computer, a navigation device, or any other product or with display capability.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A driving system for a display device, comprising:
a memory comprising a plurality of storage spaces, each storing a gamma code corresponding to one of a plurality display modes;
a gamma voltage generation device comprising two memory banks where a first memory bank stores a first gamma code for a current display mode, and the gamma voltage generation device produces a first gamma voltage corresponding to the first gamma code; and
a timing controller connected to the memory through a first set of wires and connected to the gamma voltage generation device through a second set of wires, where the timing controller accesses the gamma codes stored in the memory and writes a gamma code into a memory bank of the gamma voltage generation device;
wherein, after receiving a mode switch signal to switch from the current display mode to a next display mode, the timing controller retrieves a second gamma code corresponding to the next display mode from the memory and writes the second gamma code into a second memory bank of the gamma generation device; and the gamma voltage generation device produces a second gamma voltage corresponding to the second gamma code stored in the second memory bank during a vertical blank interval of the display device, thereby achieving display mode switch.

2. A driving method for a display device, comprising:
providing a memory, a timing controller, and a gamma voltage generation device, where the gamma voltage generation device comprises two memory banks, the timing controller is connected to the memory and the gamma voltage generation device;
storing a plurality of gamma codes, each corresponding a display mode, in the memory;
writing a first gamma code for a current display mode in a first memory bank of the gamma voltage generation device by the timing controller;
producing a first gamma voltage corresponding to the first gamma code by the gamma voltage generation device;
after receiving a mode switch signal to switch from the current display mode to a next display mode, retrieving a second gamma code corresponding to the next display mode from the memory and writing the second gamma code into a second memory bank of the gamma voltage generation device by the timing controller; and
producing a second gamma voltage corresponding to the second gamma code stored in the second memory bank during a vertical blank interval of the display device by the gamma voltage generation device, thereby achieving display mode switch.

* * * * *